United States Patent
Lee et al.

(10) Patent No.: US 10,574,772 B2
(45) Date of Patent: *Feb. 25, 2020

(54) CONTENT ENGINE FOR MOBILE COMMUNICATIONS SYSTEMS

(71) Applicant: AT&T Mobility II LLC, Atlanta, GA (US)

(72) Inventors: Bo Lee, Alpharetta, GA (US); Qingmin Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,110

(22) Filed: May 25, 2018

(65) Prior Publication Data

US 2018/0278711 A1 Sep. 27, 2018

Related U.S. Application Data

(63) Continuation of application No. 15/045,885, filed on Feb. 17, 2016, now Pat. No. 9,986,059, which is a
(Continued)

(51) Int. Cl.
*H04L 29/08* (2006.01)
*H04W 88/18* (2009.01)

(52) U.S. Cl.
CPC ...... *H04L 67/2823* (2013.01); *H04L 67/2814* (2013.01); *H04L 67/2842* (2013.01);
(Continued)

(58) Field of Classification Search
None
See application file for complete search history.

(56) References Cited

U.S. PATENT DOCUMENTS 6,161,140 A 12/2000 Moriya
6,167,441 A 12/2000 Himmel
(Continued)

FOREIGN PATENT DOCUMENTS

WO 01/086462 11/2001

OTHER PUBLICATIONS

Grieco et al., "Context-aware Provision of Advanced Internet Services," In Proceedings of the 4th annual IEEE international conference on Pervasive Computing and Communications Workshops (PERCOMW '06). IEEE Computer Society, Washington, DC, USA, pp. 600-603, 2006.

*Primary Examiner* — Hong S Cho
(74) *Attorney, Agent, or Firm* — Akerman LLP; Michael K. Dixon; Mammen (Roy) P. Zachariah

(57) ABSTRACT

An exemplary content engine includes a content gateway configured to analyze and route content requests to a content server. The content server can be a cache server or a mobile content server. The cache server can be configured to receive and store cacheable web content from a controller that is configured to receive the cacheable web content from at least one cacheable web content provider, such as a web server, and route the content to the cache server. The mobile content server can be configured to receive, from the controller, and store the digital media content. The controller can be further configured to receive the digital media content from at least one external content server and route the content to the mobile content server. The content gateway can be further configured to receive non-cacheable web content from at least one non-cacheable web content provider.

20 Claims, 3 Drawing Sheets

Related U.S. Application Data continuation of application No. 12/791,414, filed on Jun. 1, 2010, now Pat. No. 9,270,775, which is a continuation of application No. 11/752,199, filed on May 22, 2007, now Pat. No. 7,756,130.

(52) U.S. Cl.
CPC ............. *H04L 67/34* (2013.01); *H04W 88/18* (2013.01); *H04L 67/289* (2013.01)

(56) References Cited

U.S. PATENT DOCUMENTS

| | | | |
|---|---|---|---|
| 6,185,625 B1 | 2/2001 | Tso et al. | |
| 6,275,692 B1 | 8/2001 | Skog | |
| 6,351,767 B1 | 2/2002 | Batchelder et al. | |
| 6,405,252 B1 | 6/2002 | Gupta et al. | |
| 6,438,125 B1 | 8/2002 | Brothers | |
| 6,651,141 B2 | 11/2003 | Adrangi | |
| 6,708,206 B1 | 3/2004 | Thrane et al. | |
| 6,738,630 B2 | 5/2004 | Ashmore | |
| 6,754,699 B2 | 6/2004 | Swildens et al. | |
| 6,775,743 B2 * | 8/2004 | Patel | G06F 16/9574 711/118 |
| 6,785,704 B1 | 8/2004 | McCanne | |
| 6,871,065 B2 | 3/2005 | Yamaguchi | |
| 6,871,236 B2 | 3/2005 | Fishman et al. | |
| 6,907,501 B2 | 6/2005 | Tariq et al. | |
| 6,941,338 B1 | 9/2005 | Madsen | |
| 6,941,378 B2 | 9/2005 | Apostolopoulos et al. | |
| 6,944,676 B1 | 9/2005 | Armbruster et al. | |
| 6,968,389 B1 | 11/2005 | Menditto et al. | |
| 6,976,090 B2 | 12/2005 | Ben-Shaul et al. | |
| 6,981,029 B1 | 12/2005 | Menditto et al. | |
| 6,987,734 B2 | 1/2006 | Hundemer | |
| 7,010,578 B1 | 3/2006 | Lewin et al. | |
| 7,047,281 B1 | 5/2006 | Kausik | |
| 7,058,633 B1 | 6/2006 | Gnagy et al. | |
| 7,099,331 B2 | 8/2006 | Taylor | |
| 7,185,014 B1 | 2/2007 | Hansen | |
| 7,222,186 B2 | 5/2007 | Kobayashi | |
| 7,233,790 B2 | 6/2007 | Kjellberg et al. | |
| 7,257,628 B2 | 8/2007 | Liskov et al. | |
| 7,284,035 B2 | 10/2007 | Yu et al. | |
| 7,370,120 B2 | 5/2008 | Kirsch et al. | |
| 7,412,535 B2 | 8/2008 | Agarwalla et al. | |
| 7,454,457 B1 | 11/2008 | Lowery et al. | |
| 7,499,401 B2 | 3/2009 | Buddhikot et al. | |
| 7,506,059 B2 | 3/2009 | Mulligan | |
| 7,516,198 B1 | 4/2009 | Appala et al. | |
| 7,567,800 B2 | 7/2009 | Uematsu et al. | |
| 7,568,002 B1 | 7/2009 | Vacanti et al. | |
| 7,570,663 B2 | 8/2009 | Jungck | |
| 7,603,435 B2 | 10/2009 | Welingkar et al. | |
| 7,650,376 B1 * | 1/2010 | Blumenau | H04L 67/1008 709/203 |
| 7,650,420 B2 | 1/2010 | Chong et al. | |
| 7,747,744 B2 | 6/2010 | Tomioke | |
| 7,769,823 B2 | 8/2010 | Jenny et al. | |
| 7,873,705 B2 | 1/2011 | Kalish | |
| 7,987,449 B1 | 7/2011 | Marolia et al. | |
| 2001/0030970 A1 | 10/2001 | Wiryaman et al. | |
| 2002/0007404 A1 | 1/2002 | Vange et al. | |
| 2002/0035617 A1 | 3/2002 | Lynch et al. | |
| 2002/0048269 A1 | 4/2002 | Hong et al. | |
| 2002/0052942 A1 | 5/2002 | Swildens et al. | |
| 2002/0161911 A1 | 10/2002 | Pinckney et al. | |
| 2003/0028884 A1 | 2/2003 | Swart et al. | |
| 2003/0041147 A1 | 2/2003 | van den Oord et al. | |
| 2003/0167334 A1 * | 9/2003 | Butler | H04L 29/06 709/227 |
| 2003/0210694 A1 | 11/2003 | Jayaraman et al. | |
| 2003/0229681 A1 * | 12/2003 | Levitan | H04H 20/86 709/218 |
| 2004/0049579 A1 | 3/2004 | Ims et al. | |
| 2004/0078427 A1 | 4/2004 | Gil et al. | |
| 2005/0066219 A1 * | 3/2005 | Hoffman | G06F 21/6218 714/4.1 |
| 2005/0071759 A1 * | 3/2005 | Connors | G06F 17/211 715/255 |
| 2006/0075444 A1 | 4/2006 | Dillen | |
| 2006/0089160 A1 | 4/2006 | Othmer | |
| 2006/0168126 A1 | 7/2006 | Costa-Requena et al. | |
| 2006/0195909 A1 | 8/2006 | Boswell et al. | |
| 2006/0200541 A1 | 9/2006 | Wikman et al. | |
| 2006/0206610 A1 | 9/2006 | Ling et al. | |
| 2006/0212435 A1 | 9/2006 | Williams et al. | |
| 2007/0027839 A1 | 2/2007 | Ives | |
| 2007/0055689 A1 | 3/2007 | Rhoads et al. | |
| 2007/0088801 A1 | 4/2007 | Levkovitz et al. | |
| 2007/0109984 A1 * | 5/2007 | Buchholz | H04W 84/10 370/310.2 |
| 2007/0143255 A1 | 6/2007 | Mathur et al. | |
| 2007/0214251 A1 | 9/2007 | Li | |
| 2007/0244987 A1 * | 10/2007 | Pedersen | H04L 67/06 709/217 |
| 2007/0245090 A1 | 10/2007 | King et al. | |
| 2007/0260627 A1 * | 11/2007 | Knittel | G06Q 30/02 |
| 2007/0294096 A1 | 12/2007 | Randall et al. | |
| 2008/0139112 A1 | 6/2008 | Sampath et al. | |
| 2008/0162403 A1 | 7/2008 | Sundaresan | |
| 2008/0228864 A1 | 9/2008 | Plamondon | |
| 2015/0222487 A1 * | 8/2015 | Ranjekar | H04L 41/0836 726/5 |

* cited by examiner

CONTENT ENGINE FOR MOBILE COMMUNICATIONS SYSTEMS

CROSS-REFERENCE TO RELATED APPLICATION

The present application claims priority to and is a continuation of U.S. application Ser. No. 15/045,885, filed Feb. 17, 2016, which is a continuation of U.S. application Ser. No. 12/791,414, filed Jun. 1, 2010, now U.S. Pat. No. 9,270,775, which is a continuation of U.S. application Ser. No. 11/752,199, filed May 22, 2007, now U.S. Pat. No. 7,756,130, each of which are hereby incorporated by reference in their entireties.

TECHNICAL FIELD

The present invention relates generally to content provisioning. More particularly, the present invention relates to content provisioning via an intra-network content engine in a wireless communications network.

BACKGROUND OF THE INVENTION

The recent deployment of 3G networks has made a wide array of content types available to wireless subscribers. Multimedia content, such as music, games, and movies, and content rich websites and web applications, create an abundance of network traffic between a content provider residing outside of the wireless operator's network and the core and access subsystems of the network. The interfaces used for communication between the external content providers and the operator's network are inefficient and incapable of providing end-to-end quality of service (QoS) for content requests. As such, the operator's network is used as an intermediary to deliver content to subscribers. This places an inordinate amount of traffic load on the network systems. Moreover, the need to send and resend the same content for multiple subscribers places additional strain on network resources.

In addition, external content providers target general users and cannot properly consider and adapt content to a format conducive to mobile devices in general, let alone a format configured specifically for a particular mobile device.

Thus, what is needed are new systems and novel methods to optimize content provisioning to mobile subscribers, to minimize the amount of data traversing the operator's network at any given time and, to increase the overall system response time. As will be seen by the following description, such new systems and novel methods allow mobile subscribers to experience less latency, better QoS, and increased throughput, resulting in better content presentation. Wireless operators can also benefit by reduced expense associated with less redundant capacity, simpler operation and easier maintenance associated with the present invention, as well as becoming the true content provider instead of an intermediary. Content providers also benefit from increased usage of their content.

SUMMARY OF THE INVENTION

The aforementioned deficiencies are overcome by providing an intra-network content engine for processing content requests from a plurality of mobile devices. An exemplary intra-network content engine includes a content gateway configured to analyze and route content requests to a content server. The content server can be a cache server or a mobile content server. The cache server can be configured to receive and store cacheable web content from a controller that is configured to receive the cacheable web content from at least one cacheable web content provider, such as a web server, and route the content to the cache server. The mobile content server can be configured to receive and store the digital media content. The controller can be further configured to receive the digital media content from at least one external content server and route the content to the mobile content server. The content gateway can be further configured to receive non-cacheable web content from at least one non-cacheable web content provider.

An exemplary method for content provisioning via the intra-network content engine includes the steps of receiving a content request; analyzing the content request to determine to which content server the content request should be routed, wherein the content server is one of a cache server and a mobile content server; routing the content request to the cache server, if the requested content is cacheable web content; routing the content request to the mobile content server, if the requested content is digital media content; routing the content request to a non-cacheable web content provider, if the requested content is non-cacheable web content; retrieving the requested content from the appropriate source; and sending the requested content to the requesting mobile device.

A computer-readable medium that includes computer-executable instructions which, when executed, perform the steps of the foregoing method is also provided.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
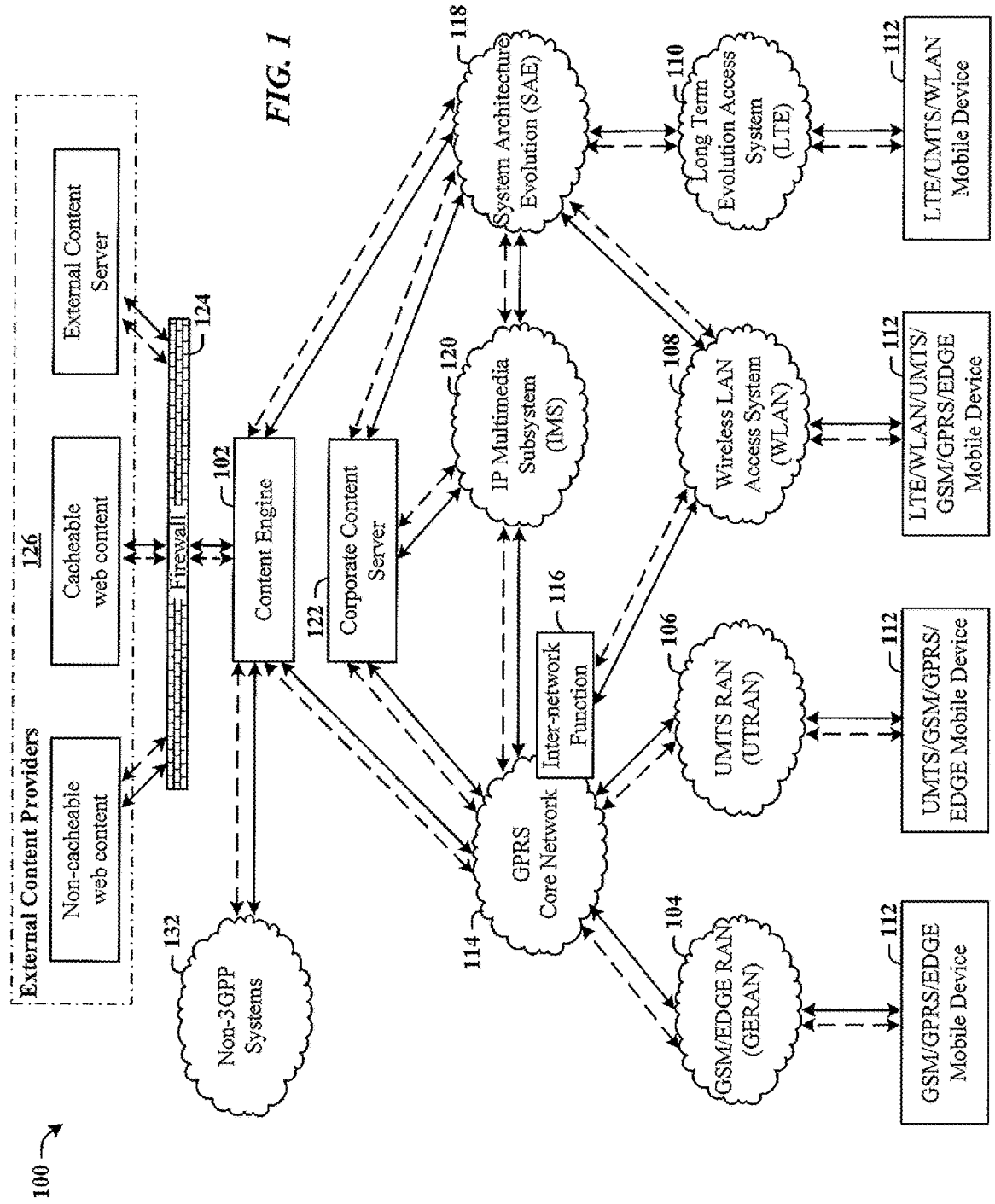
FIG. 1 illustrates an exemplary communications system in accordance with an embodiment of the present invention.

Referring now to the drawings wherein like numerals represent like elements throughout the several views, FIG. 1 illustrates a communications network 100 in which the present invention may be implemented. Multiple access network types may be used to access content provided by a content engine 102 in accordance with various embodiments of the present invention. By way of example and not limitation, the illustrated access network types include a GSM/EDGE Radio Access Network (GERAN) 104, a UMTS Terrestrial RAN (UTRAN) 106, a Wireless LAN access system (WLAN) 108, and a Long term Evolution access (LTE) system 110. Corresponding mobile devices 112 are illustrated as being in communication with the various access networks.

The GERAN 104 and UTRAN 106 are illustrated as being in communication with a GPRS core network 114 that may be further configured with an inter-network function 116 to facilitate communication with the WLAN 108. The WLAN 108 is also in communication with a System Architecture Evolution (SAE) core 118 that in turn in communication with an IMS (IP Multimedia Subsystem) core 120 and the LTE access system 110. The IMS core 120 is also in communication with the GPRS core network 114.

The GPRS core network 114, IMS core 120 and SAE core 118 are each in communication with one or more corporate content servers 122. A corporate content server 122 can provide operator-originated content; that is, content that does not originate from an external content provider. For example, proprietary ringtones, music files, videos and the like may be provided by a corporate content server 122. Although illustrated as a separate network element, the corporate content server(s) 122 may be included in the content engine 102.

The GPRS core network 114 and SAE core 118 are also in communication with the content engine 102 that in turn is in communication, via a firewall 124, with external content providers 126. As illustrated, the external content providers 126 can provide non-cacheable and cacheable web content, such as websites and web applications, and other content. Other content can include digital media content, for example, e-books, ringtones, ringback tones, music files, video files, movies, video games, news feeds (e.g., via RSS (Real Simple Syndication)), sports score feeds, weather, and other content made available via one or more external content providers.

The content engine 102 is also in communication with other non-3GPP systems 132, in which the present invention may also be practiced. The content engine 102 is now described below with reference to FIG. 2.

Figure 2:
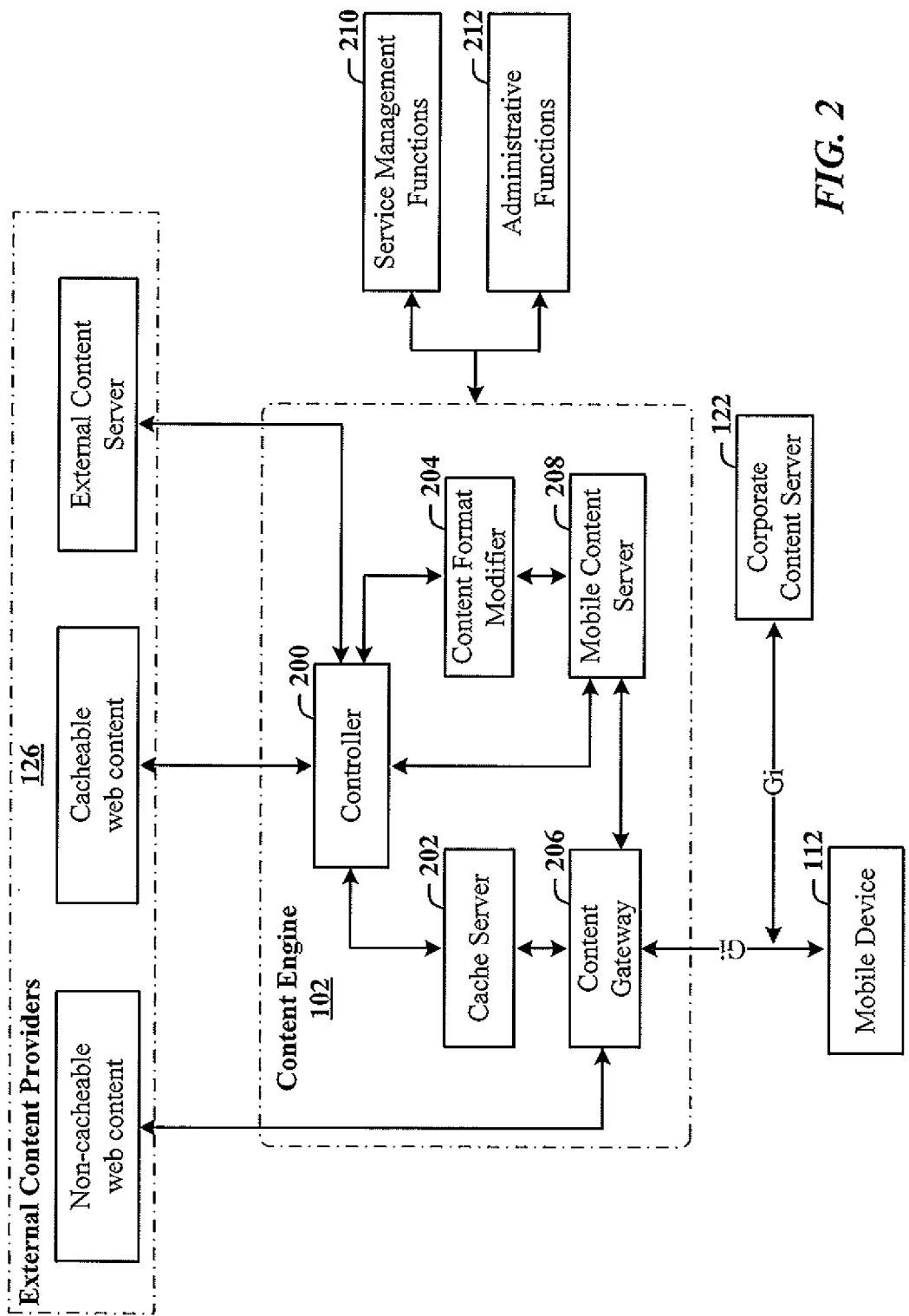
FIG. 2 illustrates an exemplary content engine in accordance with an embodiment of the present invention.

FIG. 2 illustrates a content engine 102 in accordance with an exemplary embodiment of the present invention. The illustrated content engine 102 includes a controller 200, a cache server 202, a content format modifier 204, a content gateway 206, and a mobile content server 208. The functionality of each of these elements is described below in detail.

The controller 200 provides gateway functionality to content provisioning systems, such as the external content providers 126. The controller 200 may include the firewall 124 and may perform filtering functions in accordance with filtering parameters determined by the operator. The controller 200 is also configured to route content within the engine to the appropriate processing components.

To the external content providers 126, the controller 200 performs client functions to cache websites and load content. In certain implementations, it may be beneficial to provide formatted content for a mobile device type or specific device configuration. In these implementations, the controller 200 can route content to the content format modifier 204 for reformatting content to adhere to specifications of the requesting mobile device. Afterwards, the reformatted content can be sent to the mobile content server 208 and stored. Content that does not need to be reformatted can be sent directly to the mobile content server 208.

For cacheable websites, the controller 200 forwards the content to the cache server 202 to be cached. From the mobile device perspective, the controller 200 may be invisible and the content provided to the mobile device may be presented as it would if the content was delivered directly from the original content provider.

Web content that is updated or refreshed may be done so automatically or based upon a schedule maintained by the controller or the cache server. These setting may be configured by the operator or by the client device.

The cache server 202 is configured to function as a website server for cacheable web content. Cacheable content is received by the controller 200 and forwarded to the cache server 202 for storage. The cache server 202 provides pre-caching of web content in an effort to reduce latency and improve access time for the mobile devices 112.

The content gateway 206 may be configured to determine if incoming content should or should not be cached. By way of example, content sent from virtual private networks (VPN), such as in many enterprise applications, are not cacheable. Private data, such as that exchanged in web sessions with bank accounts or personal email accounts are other examples of non-cacheable content.

In one embodiment, the content gateway 206 can be configured to store and maintain a lookup table of the current cache in the cache server 202. Likewise, the cache server 202 may be configured to send updates to the content gateway 206 on an as-needed or periodic basis to update the lookup table. The content gateway 206 may also store a record of all content requests and may itself request that specific websites be cached; for example, if access to a website exceeds a pre-determined threshold value, then a request may be sent to the cache server requesting that the website be cached for future use. Either or both of the content gateway 206 and the cache server 202 may be configured with a plurality of rules to determine if a website is cacheable and if a website needs to be cached, based upon previous usage data, for example. Generally, the caching rules can be developed based upon the business needs of the mobile operator.

The mobile content server 208 is the digital media content server to the network subscribers. The digital media content received from the external content providers is formatted (if necessary) and readied to be sent to the mobile device 112 via the content gateway 206 upon request. Maintaining all content within the operator's network as opposed to the operator substituting as an intermediary between the end user and the content provider allows the mobile operator to provide content with less latency, better QoS, and increased throughput, resulting in better content presentation.

The content gateway 206 provides an interface to the packet core network. For 3GPP applications, such as the illustrated embodiment, the Gi interface is used. The content gateway 206 receives requests from mobile devices and routes the request to the mobile content server 208 for content such as ringtone, music, or videos. For cacheable content, the requests are routed to the cache server 202. The content gateway 206 also routes the requested content to the mobile devices 112 from these elements.

The content gateway 206 may also be configured with firewall and/or filtering functions to reduce potential contamination of the content being exchanged between the content engine 102 and the mobile devices 112, and to reduce the likelihood of a security breach.

The content gateway 206 may be further configured to steer traffic by maintaining an index of all available websites, applications, and individual content currently or scheduled to be available from the cache server 202 and/or mobile content server 208. Lookup tables for the cache server 202 and/or the mobile content server 208 may provide this information. The lookup tables may be updated by the host server (i.e., either the cache server 202 or the mobile content server 208) via periodic updates or as-needed.

Service management functions 210 and administrative functions 212 are also in communication with the content engine 102. Service management functions can include, but are not limited to, maintaining licensing agreements for copyright protected content. Administrative functions 212 can include content engine 102 software, hardware, or firmware upgrades, and account management features, such as account creation, account closure, and communication with the operator's billing system to bill for billable content.

Figure 3:
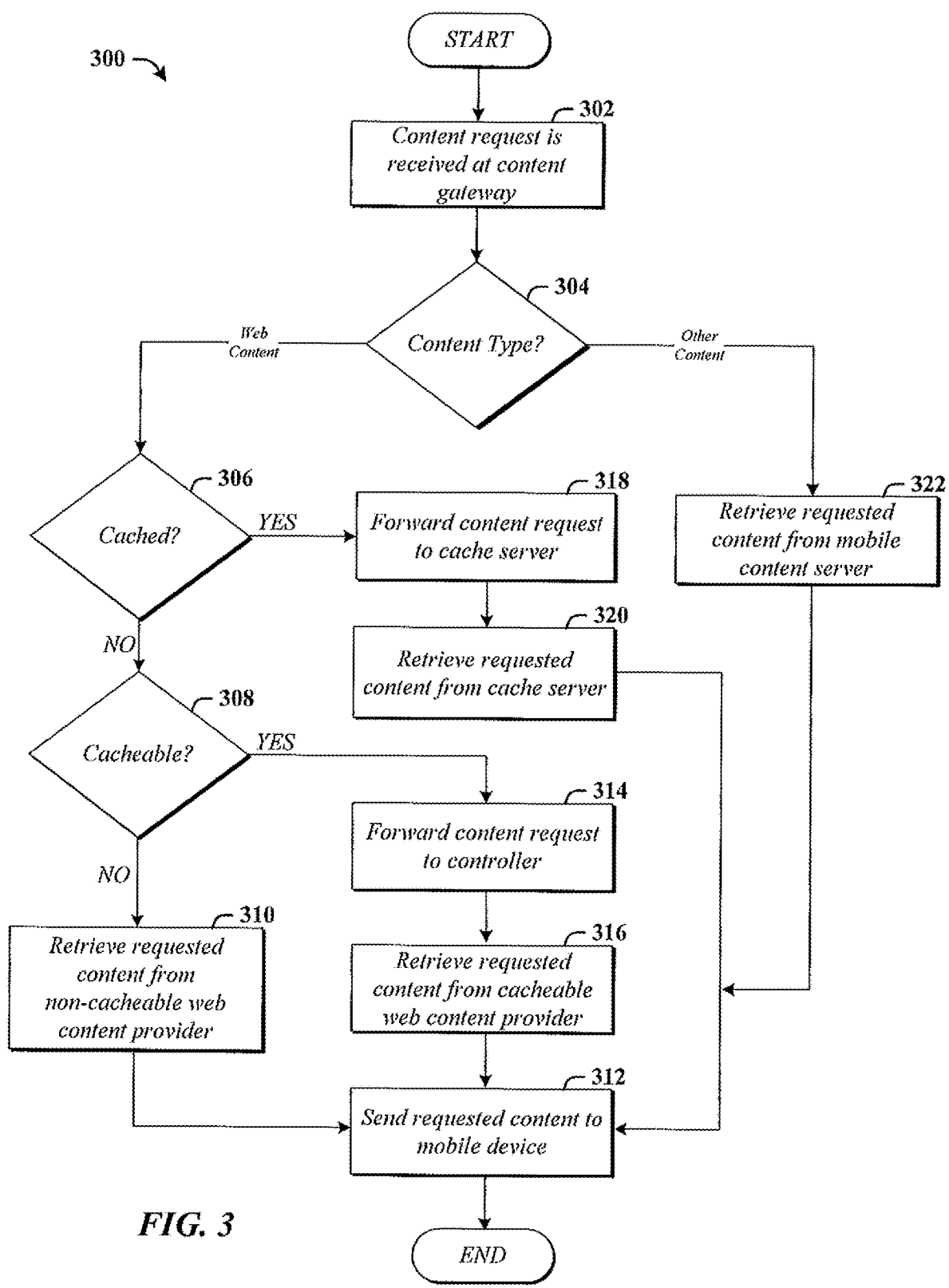
FIG. 3 illustrates an exemplary methodology for processing a content request by the exemplary content engine of FIG. 2, according to the present invention.

Referring now to FIG. 3, a flow diagram of an exemplary method for provisioning content via an inter-network content engine, such as content engine 202, is illustrated. The method 300 begins and proceeds to step 302 wherein a content request is received at the content gateway 206. The content gateway 206 can determine, based upon information in the content request, the type of content that is being requested. More particularly, whether the content is web content, or other content, such as a digital media content. This determination is illustrated as step 304.

If it is determined that the content is web content, flow proceeds to step 306 wherein a determination is made as to whether the web content is cached. If the content is not cached, flow proceeds to step 308 wherein a determination is made as to whether the web content is cacheable. This determination may be made by processing the request in accordance with a plurality of rules to determine if the content is cacheable. Moreover, historical data such as provided by lookup table records may be used to aid in this determination.

If it is determined that the content is not cacheable, flow proceeds to step 310 wherein the requested content is retrieved from the external content provider 126 associated with the requested content. For example, the external content provider 126 may be a bank account server that contains personal data that should not be cached. The content gateway 206 then sends the requested content to the requesting mobile device 112 at step 312. If, however, it is determined that the content is cacheable, the content gateway 206 forwards the content request to the controller 200 at step 314. The controller 200 can then retrieve the content and send the content to the content gateway 206 at step 316. The content gateway 206 can forward the content to the requesting mobile device 112 at step 312.

If the content is cached, as determined in step 306, the content gateway 206 can forward the content request to the cache server 202 at step 318. The content gateway 206 receives the content from the cache server 202 at step 320 and forwards the content to the requesting mobile device 112 at step 312.

If it is determined at step 304 that the content request type is for other content, the flow proceeds to step 322 and the content gateway 206 retrieves the requested content from the mobile content server 208. The request may include a device type or other device specifications for which the requested content is to be formatted. By way of example and not limitation, this information may be provided via an International Mobile Equipment Identity (IMEI) or by at least one of the make, model, and revision of the mobile device. The mobile content server 208 may be configured to store a plurality of different configurations for the stored content, such as the most often used format types. In this embodiment, the mobile content server 208 could retrieve the appropriately formatted content and return it to the content gateway 206. The content gateway 206 then forwards the content to the requesting mobile device 112 at step 312.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system, comprising:
a memory that stores instructions;
a processor that executes the instructions to perform operations, the operations comprising:
retrieving content in response to a request for content received from a device;
modifying, based on a characteristic of the device, the content to create modified content customized for the device;
transmitting, to the device and based on a time when the modified content is scheduled to be available, the modified content customized for the device;
determining a most often used format type for the content; and
storing a configuration of the content corresponding to the most often used format type for the content.

2. The system of claim 1, wherein the characteristic of the device comprises a hardware component, a software component, or a firmware component of the device.

3. The system of claim 1, wherein the transmitting of the content further comprises transmitting the modified content to the device based on an index of content that indicates the time when the modified content is scheduled to be available.

4. The system of claim 1, wherein the transmitting of the content is facilitated by a controller invisible to the device.

5. The system of claim 4, wherein the transmitting of the content further comprises transmitting the modified content to the device by the controller to appear as if the modified content is delivered directly from an original content provider instead of the controller.

6. The system of claim 1, wherein the operations further comprise reducing a potential contamination of the content by utilizing a filtering function.

7. The system of claim 1, wherein the operations further comprise storing a plurality of different configurations for the content.

8. The system of claim 1, wherein the operations further comprise determining if the content is cached.

9. The system of claim 1, wherein the operations further comprise determining if the content is cacheable.

10. The system of claim 9, wherein the operations further comprise retrieving the content from an external content provider if the content is not cacheable.

11. The system of claim 1, wherein the operations further comprise determining, based on the request, a type of the content.

12. The system of claim 1, wherein the operations further comprise identifying a type of the device.

13. The system of claim 1, wherein the operations further comprise maintaining a lookup table of a current cache.

14. A method, comprising:
   obtaining content in response to a request for content received from a device;
   modifying, based on a characteristic of the device and by utilizing instructions from a memory that are executed by a processor, the content to create modified content customized for the device;
   providing, to the device and based on a time when the modified content is scheduled to be available, the modified content customized for the device;
   determining a most often used format type for the content; and
   caching a configuration of the content corresponding to the most often used format type for the content.

15. The method of claim 14, further comprising reducing a potential contamination of the content by utilizing a firewall function.

16. The method of claim 14, further comprising updating the content based on a schedule.

17. The method of claim 14, further comprising determining if access to the content has exceeded a threshold value.

18. The method of claim 17, further comprising caching the content if the access to the content has exceeded the threshold value.

19. The method of claim 14, further comprising transmitting the modified content to the device based on an index of content.

20. A non-transitory computer-readable medium of a content engine comprising computer-executable instructions, which, when loaded and executed by a processor, cause the processor to perform operations, the operations comprising:
   obtaining content in response to a request for content received from a device;
   altering, based on a characteristic of the device, the content to create modified content customized for the device;
   providing, to the device and based on a time when the modified content is scheduled to be available, the modified content customized for the device;
   determining a most often used format type for the content; and
   storing a configuration of the content corresponding to the most often used format type for the content.

* * * * *